United States Patent
Groten et al.

[11] Patent Number: 6,000,685
[45] Date of Patent: Dec. 14, 1999

[54] GAS/LIQUID CONTACT STRUCTURE

[75] Inventors: Willibrord A. Groten; Derwyn Booker, both of Houston, Tex.

[73] Assignee: Catalytic Distillation Technologies, Pasadena, Tex.

[21] Appl. No.: 09/106,999

[22] Filed: Jun. 29, 1998

[51] Int. Cl.[6] ........................................ B01F 3/04
[52] U.S. Cl. ................. 261/112.2; 55/497; 55/499; 55/521; 96/190; 96/296; 96/326; 261/106; 261/113
[58] Field of Search ................. 261/106, 112.2, 261/113, DIG. 72; 55/482, 485, 497, 499, 521, 525; 96/190, 296, 297, 326, 363

[56] References Cited

U.S. PATENT DOCUMENTS

| | | | |
|---|---|---|---|
| 2,591,343 | 8/1952 | Eld | 261/113 |
| 2,767,967 | 10/1956 | Hutchinson | 261/113 |
| 3,070,937 | 1/1963 | Bub | 55/485 |
| 3,372,533 | 3/1968 | Rummel | 55/499 |
| 3,917,764 | 11/1975 | Phelps | 261/112.2 |
| 4,287,097 | 9/1981 | Fratzer et al. | 252/462 |
| 4,363,753 | 12/1982 | Bozon et al. | 252/477 |
| 4,455,339 | 6/1984 | Meier | 428/185 |
| 4,497,752 | 2/1985 | Huber | 261/95 |
| 4,497,753 | 2/1985 | Streiff | 261/95 |
| 4,536,373 | 8/1985 | Jones, Jr. | 422/211 |
| 4,744,928 | 5/1988 | Meier | 261/95 |
| 5,348,710 | 9/1994 | Johnson et al. | 422/211 |
| 5,395,600 | 3/1995 | Cornelison | 55/497 |
| 5,407,605 | 4/1995 | Resetaris et al. | 261/98 |
| 5,413,741 | 5/1995 | Buchholz et al. | 261/112.2 |
| 5,523,062 | 6/1996 | Hearn et al. | 422/195 |
| 5,554,329 | 9/1996 | Monkelbaan et al. | 261/98 |
| 5,558,689 | 9/1996 | Yanagihara et al. | 55/499 |
| 5,730,843 | 3/1998 | Groten et al. | 202/158 |

FOREIGN PATENT DOCUMENTS

| | | |
|---|---|---|
| 1186647 | 4/1970 | United Kingdom . |
| 1471442 | 4/1977 | United Kingdom . |
| 1569828 | 6/1980 | United Kingdom . |
| 1604361 | 12/1981 | United Kingdom . |
| 0396650 | 10/1992 | United Kingdom . |

*Primary Examiner*—C. Scott Bushey
*Attorney, Agent, or Firm*—Kenneth H. Johnson

[57] ABSTRACT

A gas liquid contact structure having a plurality of corrugated woven wire sheets alternated with rigid support members to separate and support the woven wire sheets. The vees or peaks of the corrugations are aligned and oriented in the same direction with the rigid support members separating and preventing the corrugations from nesting together.

9 Claims, 4 Drawing Sheets

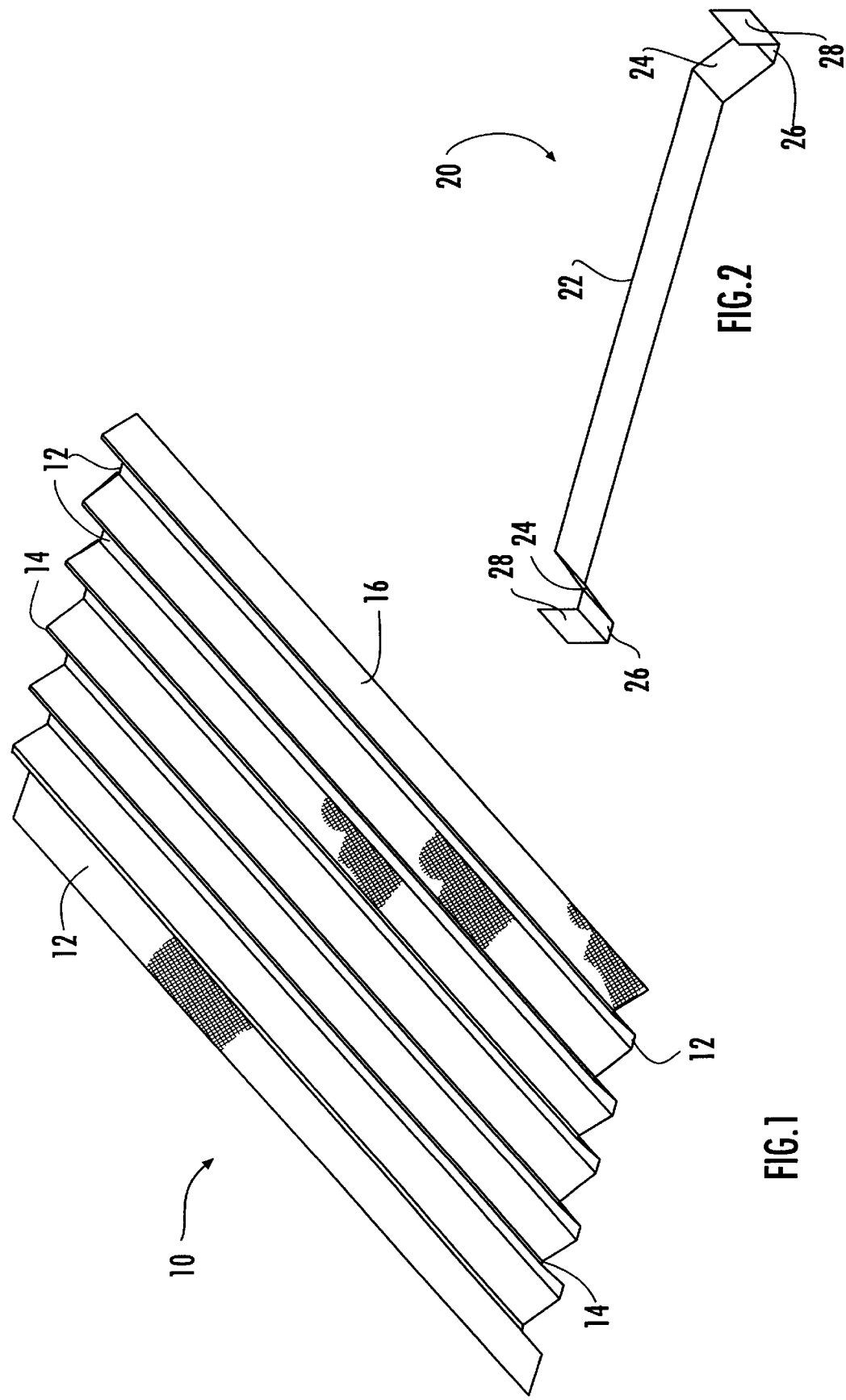

GAS/LIQUID CONTACT STRUCTURE

BACKGROUND OF THE INVENTION

1. Field of the Invention

The present invention relates to a structure for placement in a vessel to act as a distillation packing or a demister pad to remove entrained liquid from vapors. More particularly the invention relates to a packing made up of corrugated woven wire mesh sheets separated and supported by a rigid support element and made up into a bale.

2. Related Art

Many types of packing have been developed for use in mass transfer or heat exchange columns. In general, these packing facilitate contact between the liquid and vapor streams by causing more uniform distribution of liquid and vapor over the surface of the packing.

Corrugated plates, known as ripple trays have long been used in the art. See for example U.S. Pat. Nos. 2,591,343 and 2,767,967. Also corrugated plates have been used as distribution trays in packed columns. See for example U.S. Pat. No. 5,523,062.

The use of corrugated woven wire fabric as distillation structure has also been known in the art.

In addition flat woven wire demister pads have been used to remove entrained liquid in vapors. The entrained liquid impinges upon the wires and drains downward by gravity while the vapor passes through the openings in the mesh. Generally demister pads comprises a plurality of sheets of the woven wire fabric closely packed together to prevent the trapped liquid from becoming entrained again.

SUMMARY OF THE INVENTION

The present invention comprises a plurality of corrugated woven wire sheets alternated with a plurality of rigid support members to separate and support the woven wire sheets. The vees or peaks of the corrugations are aligned and oriented in the same direction with the rigid support members separating and preventing the corrugations from nesting together. The sheets may be oriented vertically within a column if to be used for a demister pad or horizontally if the use is for distillation.

BRIEF DESCRIPTION OF THE DRAWING

FIG. 1 is a perspective view of the corrugated woven wire sheet element use in the invention.

FIG. 2 is a perspective view of the rigid support member used in the invention.

DESCRIPTION OF THE PREFERRED EMBODIMENT

Figure 3:
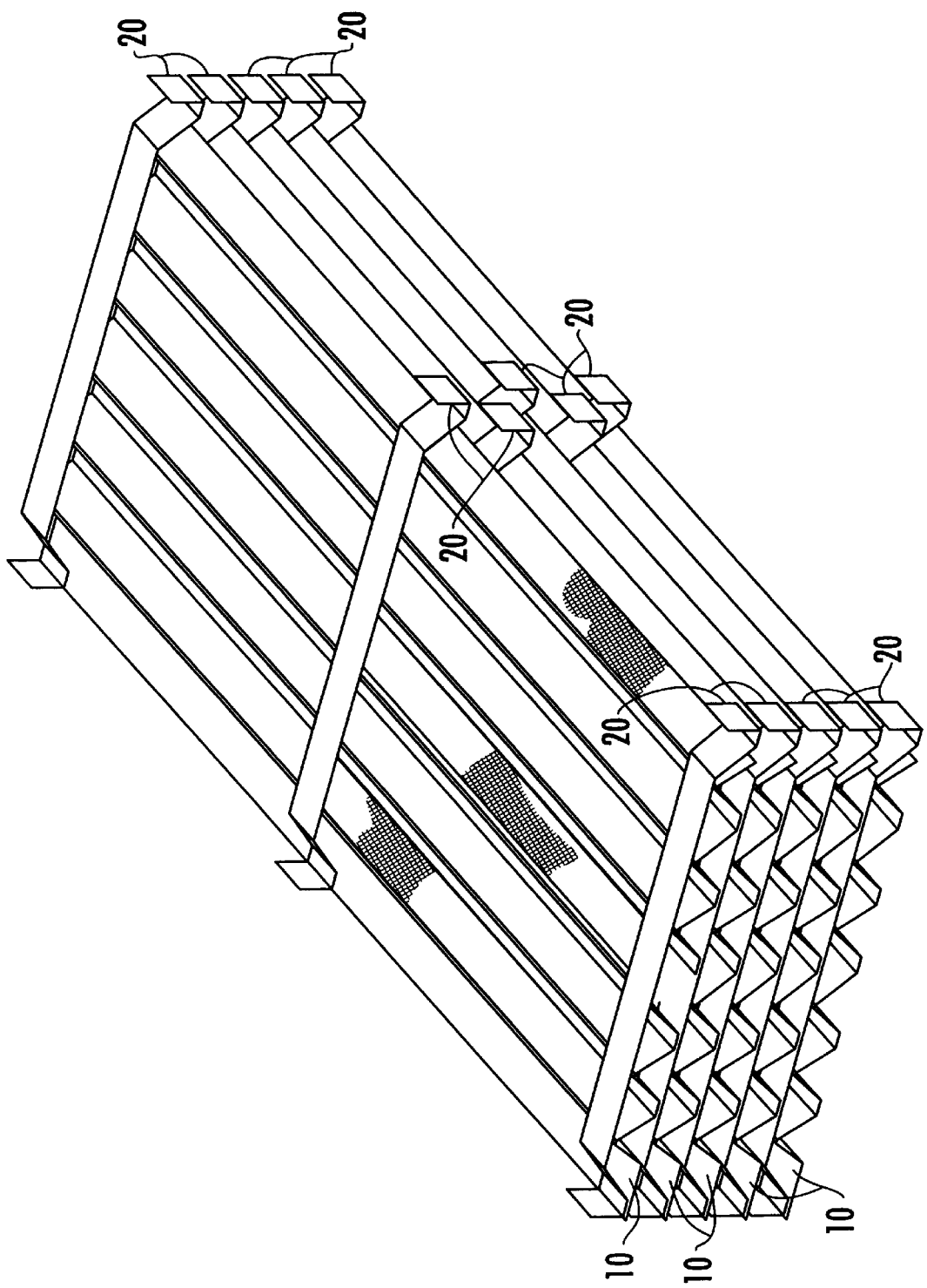
FIG. 3 is a perspective of the contact structure of the invention.

In the accompanying figures like components are given like numerals for ease of reference. For the purposes of this invention each corrugated sheet is understood to have two ends and two sides. In referring to the sheets the term "ends" shall mean the terminus of the sheet having a corrugated cross section and the term "side" shall mean the terminus parallel to the corrugations.

The two individual elements, which comprise the structure are depicted in FIGS. 1 and 2. The first element is a corrugated woven wire sheet depicted generally at 10. The corrugated wire sheet 10 has inverted vee shaped corrugations having peaks 14. Between each peak is a flat section 12. As depicted the walls 16 of the vee shaped corrugations are at about 90° from each other.

The second individual element is a planer rigid member generally depicted as 20 in FIG. 2. The rigid member includes a middle section 22. At either end the rigid member is configured to provide support members 28. The support members 28 are connected to the middle section by a sloped section 24 which is substantially at the same angle as the angle of the vees ($\approx 90°$)and a return section 26 which is shown to be angled but may also be curved. The support members are vertical and substantially equal in height to the depth between said vees.

Figure 4:
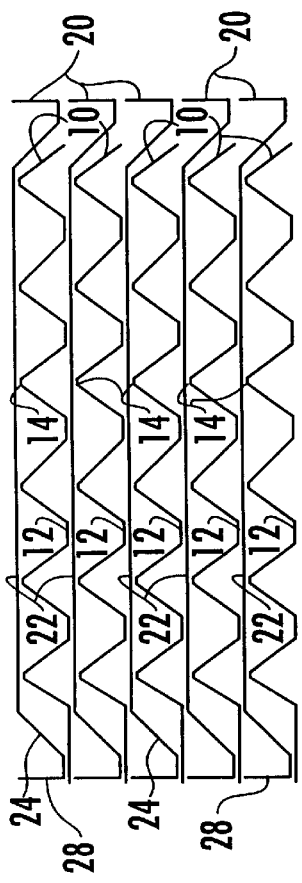
FIG. 4 is an end view of the contact structure of FIG. 3.
Figure 5:
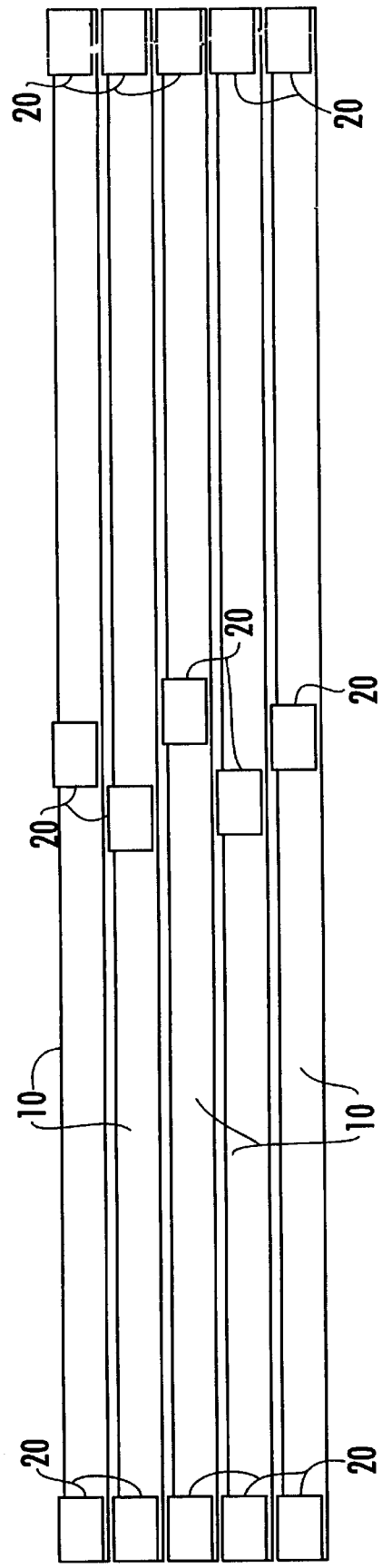
FIG. 5 is a side elevational view of the contact structure of FIG. 3.
Figure 6:
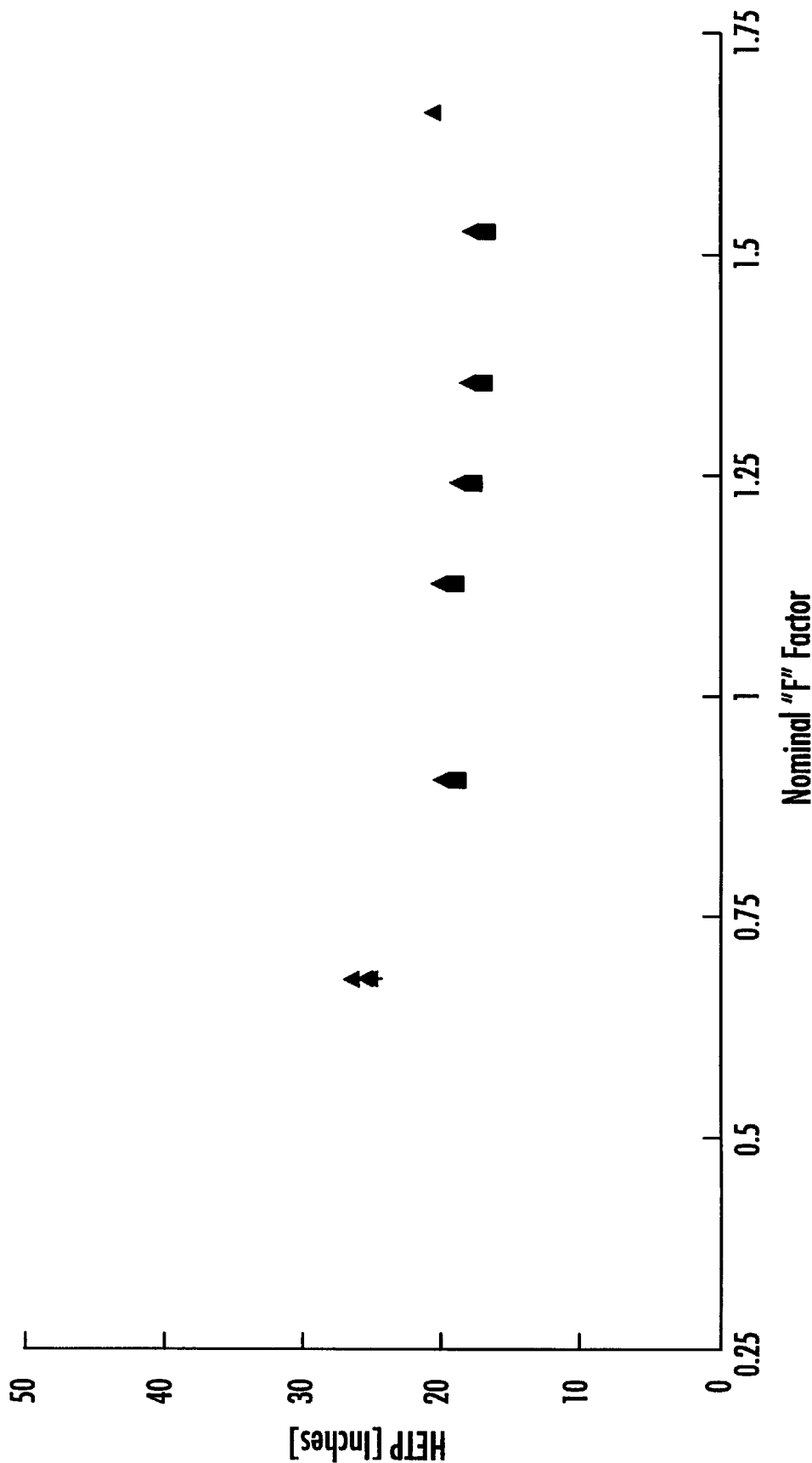
FIG. 6 is a graphical representation of the data found in TABLE 1.

To construct the gas liquid contact structure a plurality of the corrugated woven wire mesh sheets 10 of preferably substantially uniform size are stacked together and separated by a plurality of the rigid support members 20, which are preferably also substantially the same size as shown in FIG. 3. FIG. 4 shows an end view of a structure. The peaks 14 of each of the corrugated woven wire sheets 10 are oriented in the same direction (in FIG. 3 up) and are aligned. The corrugated woven wire sheets would thus nest together if not separated by the rigid support members 20. Each middle section 22 of the rigid support members 20 each rest on the peaks 14 on one surface of the middle section and the flats 12 of an adjacent corrugated woven wire sheet 10 in turn rest on the other surface of the middle section 22 of the rigid support member, unless the support member is the last element of the structure as shown in FIG. 4 where the topmost support member 22 is the last element. There will always be at least two of each of the elements in each structure according to the present invention, thus at least one support member will have peaks contacting one surface and the flats contacting the opposed surface. The end support members 28 provide extra stiffness between the corrugated woven wire sheets 10 to prevent the peaks 14 from being crushed together. There are intermediate rigid support members 20 between the ends as depicted in FIG. 5 which is a side view of the structure. The intermediate rigid support members may be randomly spaced as necessary to provide the requisite stiffness and strength. The corrugated woven wire sheets 10 are secured to the rigid support members 20 in standard fashion such as spot welding or soldering.

In use the structures are placed in a liquid vapor contact vessel such as a distillation column or liquid knock out vessel. If used in a distillation vessel the structures may be oriented with the corrugated woven wire sheets' planar surface horizontal in the vessel. In this way some liquid will build up on the sheets due to the rising vapors and good contact will be maintained. If used in a liquid knockout vessel the corrugated woven wire sheets' planar surface should be oriented vertically to allow entrained liquid impinging the wires to drain downward by gravity.

In TABLE 1 below there is shown a comparison of height equivalent to theoretical plates (HETP) for the structure versus the nominal "F" factor. The "F" factor is a measure of hydraulic loading calculated by the following equation:

$$F = \text{vapor velocity} \times (\text{vapor density})^{0.5}$$

TABLE 1

| Nominal F factor $ft/sec(lb/ft_3)^{0.5}$ | HETP inches |
|---|---|
| 0.9019 | 26.7 |
| 0.9025 | 25.53 |
| 0.9027 | 25.04 |
| 1.2040 | 19.39 |
| 1.2047 | 19.02 |
| 1.4989 | 19.45 |
| 1.5032 | 19.27 |
| 1.5041 | 19.55 |
| 1.6561 | 18.50 |
| 1.6563 | 18.30 |
| 1.6569 | 18.00 |
| 1.8059 | 17.64 |
| 1.8059 | 17.61 |
| 1.8073 | 17.31 |
| 2.0352 | 17.53 |
| 2.0360 | 17.37 |
| 2.0364 | 17.12 |
| 2.2120 | 21.07 |

The invention claimed is:

1. A gas-liquid contact structure comprising a plurality of sheets of wire mesh formed into vee shaped corrugations having flats between the vees, said plurality of sheets being of substantially uniform size having the peaks oriented in the same direction and substantially in alignment, said sheets being separated by a plurality of rigid members oriented normally to and resting upon said vees and supporting said flats.

2. The gas-liquid contact structure of claim 1 wherein each of said rigid members comprise planer bars having two ends.

3. The gas-liquid contact structure of claim 2 wherein each of said rigid members further comprise support members at either end.

4. The gas-liquid contact structure of claim 3 wherein said support members comprise a first section of said bar bent at an angle substantially equal to the angle of slope of said vees and a vertical section substantially equal in height to the depth between said vees.

5. The gas-liquid contact structure of claim 1 wherein there is a rigid member between each of said sheets near each vee terminal end and rigid members randomly spaced along said sheets.

6. A gas-liquid contact structure comprising (a) a plurality of sheets of wire mesh formed into vee shaped corrugations having flats between the vees, said plurality of sheets having the vees oriented in the same direction and substantially in alignment; and (b) a rigid member separating each adjacent pair of said sheets comprising,
 (i) a planer bar against said sheets and
 (ii) support members at each end of said bar.

7. The gas-liquid contact structure of claim 6 wherein said support members comprise a first section of said bar bent at an angle substantially equal to the angle of slope of said vees and a vertical section substantially equal in height to the depth between said vees.

8. A gas-liquid contact structure comprising (a) at least two sheets of wire mesh formed into vee shaped corrugations having flats between the vees and two ends and two sides, each of said sheets having the vees oriented in the same direction and substantially in alignment; and (b) at least two rigid members extending from side to side of said sheets, at least one of said rigid members separating two of said sheets, said members comprising,
 (i) a planer bar against said sheets and
 (ii) support members at each end of said bars adjacent to the sides of said sheets.

9. The gas-liquid contact structure according to claim 8 comprising rigid members adjacent to the ends of said sheets.

* * * * *